United States Patent [19]

Cianciosi

[11] Patent Number: 5,184,226
[45] Date of Patent: Feb. 2, 1993

[54] DIGITAL VIDEO PULSE WIDTH AND POSITION MODULATOR

[75] Inventor: Michael S. Cianciosi, Rochester, N.Y.

[73] Assignee: Xerox Corporation, Stamford, Conn.

[21] Appl. No.: 783,011

[22] Filed: Oct. 25, 1991

[51] Int. Cl.⁵ .................... H04N 1/40; G01D 9/42
[52] U.S. Cl. ...................... 358/296; 358/300; 358/409; 358/410; 346/108
[58] Field of Search ............... 358/296, 298, 300, 409, 358/410; 346/108, 160

[56] References Cited

U.S. PATENT DOCUMENTS

| | | | |
|---|---|---|---|
| 4,347,523 | 8/1982 | Ohara | 346/108 |
| 4,375,065 | 2/1983 | Ohara | 346/108 |
| 4,689,690 | 8/1987 | Aagano | 358/410 |
| 4,819,008 | 4/1989 | Nagato et al. | 358/298 X |
| 4,851,927 | 7/1989 | Moriya | 358/300 |
| 4,905,023 | 2/1990 | Suzuki | 346/108 |
| 4,965,672 | 10/1990 | Duke et al. | 358/298 |
| 5,001,410 | 3/1991 | Ono | 358/409 X |
| 5,068,676 | 11/1991 | Yoshida | 346/108 |

Primary Examiner—Benjamin R. Fuller
Assistant Examiner—Eric Frahm
Attorney, Agent, or Firm—Finnegan, Henderson, Farabow, Garrett & Dunner

[57] ABSTRACT

A digital electronics system for generating pulses from a series of data words incluidng RAM lookup tables for translating the series of data words into a series of pulse attribute words, where each pulse attribute word includes information for controlling the formation of a corresponding pulse, multiplexers for splitting the series of pulse attribute words into two channels, pulse forming circuits corresponding to each channel for accepting pulse attribute words from respective channels and forming pulses using the information included in the pulse attribute words, and control circuits for generating the pulses, where a pulse from a first pulse forming circuit is generated while a pulse from a second pulse forming circuit is being formed.

15 Claims, 11 Drawing Sheets

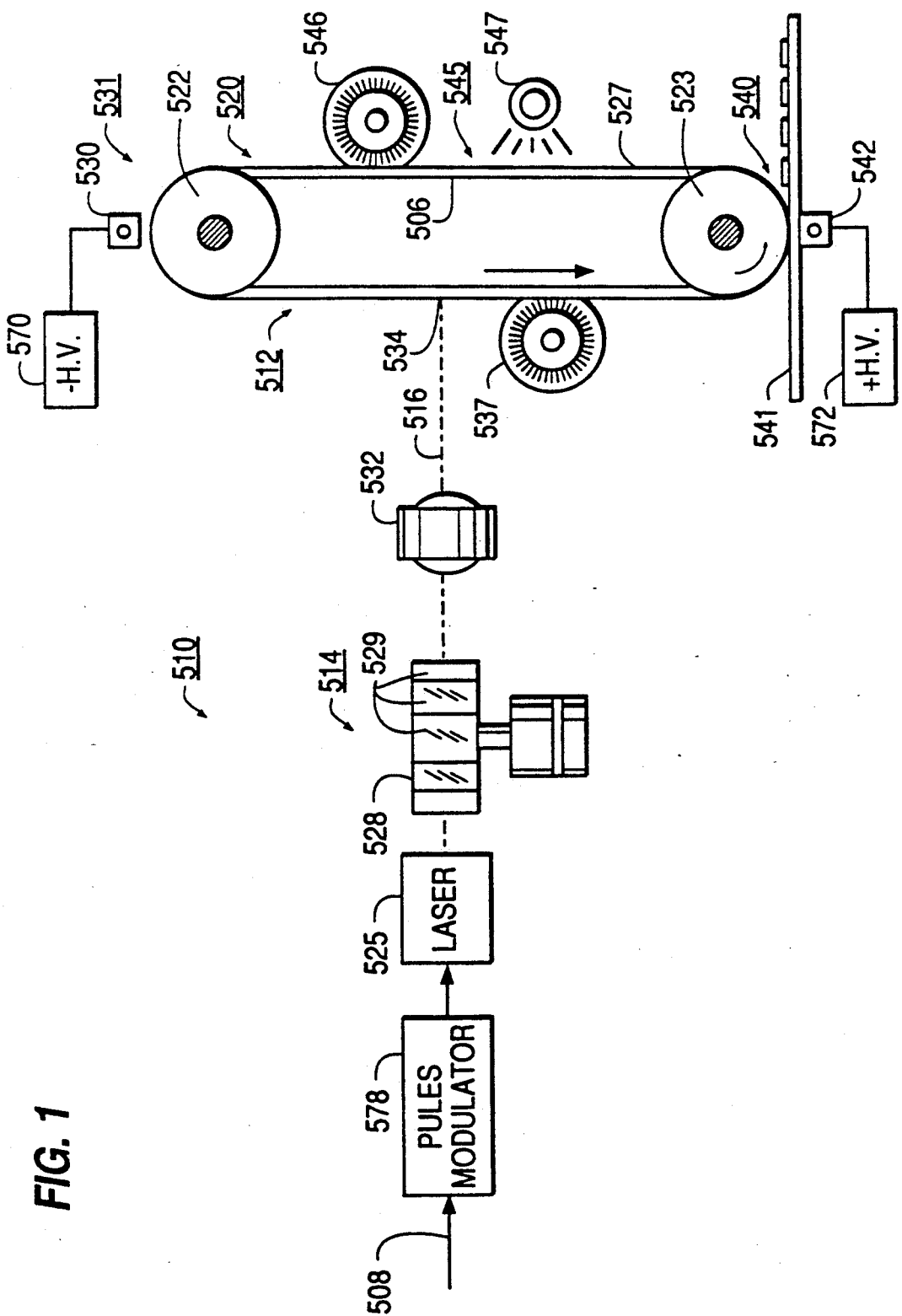

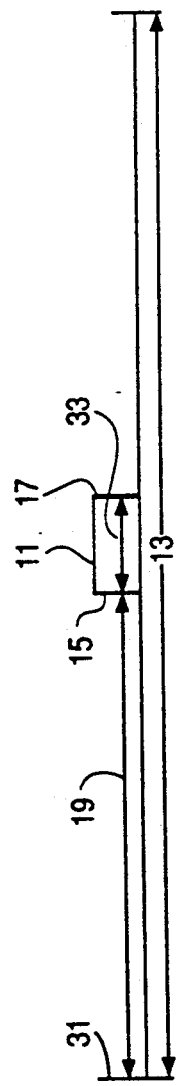
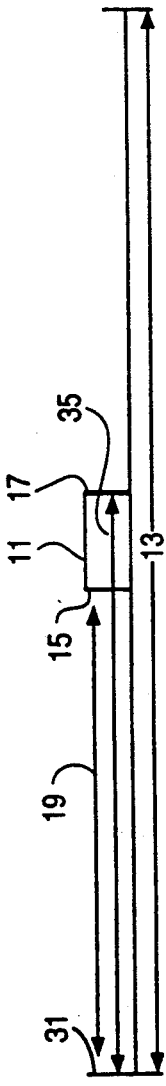

FIG. 6(a)
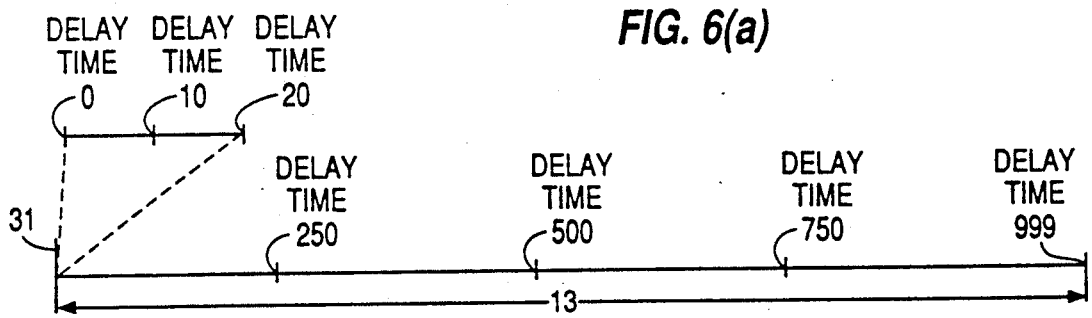
FIG. 6(b)
| VIDEO DATA WORD | PULSE ATTRIBUTE FOR LEADING EDGE |
|---|---|
| 0000 0000 | DELAY TIME 10 |
| 0000 0001 | DELAY TIME 111 |
| 0000 0010 | DELAY TIME 500 |
| 0000 0011 | DELAY TIME 336 |
| ⋮ | ⋮ |
| 1111 1110 | DELAY TIME 250 |
| 1111 1111 | DELAY TIME 55 |
FIG. 6(c)
| VIDEO DATA WORD | PULSE ATTRIBUTE FOR TRAILING EDGE |
|---|---|
| 0000 0000 | DELAY TIME 20 |
| 0000 0001 | DELAY TIME 180 |
| 0000 0010 | DELAY TIME 750 |
| 0000 0011 | DELAY TIME 862 |
| ⋮ | ⋮ |
| 1111 1110 | DELAY TIME 875 |
| 1111 1111 | DELAY TIME 655 |
FIG. 6(d)
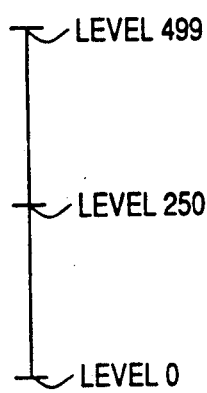
FIG. 6(e)
| VIDEO DATA WORD | PULSE ATTRIBUTE FOR AMPLITUDE |
|---|---|
| 0000 0000 | LEVEL 401 |
| 0000 0001 | LEVEL 108 |
| 0000 0010 | LEVEL 250 |
| 0000 0011 | LEVEL 294 |
| ⋮ | ⋮ |
| 1111 1110 | LEVEL 499 |
| 1111 1111 | LEVEL 93 |

DIGITAL VIDEO PULSE WIDTH AND POSITION MODULATOR

BACKGROUND OF THE INVENTION

1. Field of the Invention

The present invention relates generally to a digital pulse modulator and, more particularly, to a digital pulse width and position modulator, which accepts a video signal and generates a corresponding video pulse.

2. Description of Related Art

In a scanning system that uses a beam for generating information, a digital pulse forming circuit may be used to control the scanning beam. The beam may vary in intensity and duration according to the pulses used to control the beam.

A laser beam may be used in a printer, for example, for discharging negative image areas on a photoreceptor. The latent electrostatic image formed on the photoreceptor by the beam attracts developing toner in proportion to the latent image charge level in order to develop the image.

As another example, a cathode ray tube uses an electron beam to scan a phosphorous screen. The electron beam may be varied in intensity and duration to accurately display information on the phosphorous screen.

In both examples, a pulse forming circuit may be used to generate pulses to control the intensity and operation time of the respective beams. An apparatus of particular interest to the technology of varying the width and position of pulses used to control a laser beam is disclosed in U.S. Pat. No. 4,965,672 to Duke et al. Another apparatus of general interest that uses pulse number and pulse position modulation to control a laser beam is disclosed in U.S. Pat. No. 4,375,065 to Ohara. Ohara also discloses in U.S. Pat. No. 4,347,523 an apparatus of general interest which uses an input signal to address pulse numbers with corresponding pulse width selection numbers. An image forming apparatus of general interest is disclosed in U.S. Pat. No. 4,905,023 to Suzuki and uses a plurality of conversion tables addressed by an input video image signal to generate pulses.

In a high speed scanning system, the reset time of a pulse forming circuit is the time needed for the pulse forming circuit to reset to an initial state before a new pulse can be generated. Thus, the speed of a pulse forming circuit is limited by the amount of time it takes the circuit to form a pulse and reset to its initial state.

The speed of the pulse forming circuit may be the limiting factor of the speed of the scanning system. In such a case, it is desired to increase the speed of the pulse forming circuit. A solution to this problem is to increase the clock frequency of the pulse forming circuit, however, a higher frequency circuit requires the use of expensive circuit components.

SUMMARY OF THE INVENTION

An object of the present invention is to provide a digital video pulse width and position modulator that can process a video signal into video pulses at a high speed without the use of expensive, high speed pulse forming circuits.

Additional objects and advantages of the present invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a high speed pulse modulator formed from a plurality of pulse forming circuits in parallel so that pulses can be formed at a high rate without use of expensive circuit components.

The invention further comprises, as embodied and broadly described herein, a digital electronics system for generating pulses from a series of data words comprising means for translating the series of data words into a series of pulse attribute words, wherein each pulse attribute word includes information for controlling the formation of a corresponding pulse, means for splitting the series of pulse attribute words into two or more channels, means corresponding to each channel for accepting pulse attribute words from respective channels and forming pulses using the information included in the pulse attribute words for controlling the formation of the pulses, and means for generating the pulses, wherein a pulse from a first pulse forming means is generated while a pulse from a second pulse forming means is being formed.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1 is a schematic view of an example of a laser printer that may utilize the pulse modulator of the present invention;

FIG. 2 is a schematic diagram illustrating a pulse with variable width, position, and amplitude according to a first embodiment, of the present invention;

FIG. 4 is a schematic diagram which illustrates a pulse with variable width, position, and amplitude according to a second embodiment of the present invention;

FIG. 6(a) is a schematic diagram which illustrates a pulse pixel and corresponding delay time choices within the pixel;

FIG. 6(b) is a schematic diagram which illustrate a lookup table for generating leading edge delay pulse attribute words;

FIG. 6(c) is a schematic diagram which illustrate a lookup table for generating trailing edge delay pulse attribute words;

FIG. 6(d) is a schematic diagram which illustrates amplitude level choices for a pulse;

FIG. 6(e) is a schematic diagram which illustrate a lookup table for generating amplitude pulse attribute words;

DETAILED DESCRIPTION OF THE PREFERRED EMBODIMENTS

Figure 3A:
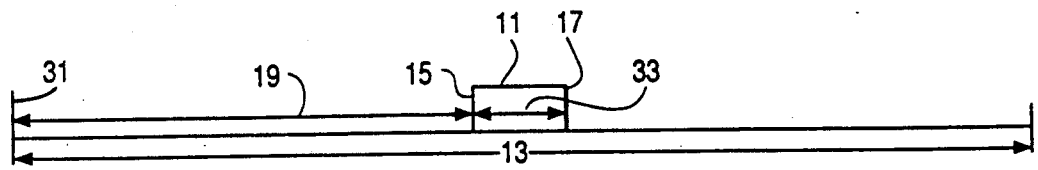
FIGS. 3(a) through 3(d) are schematic diagrams which show examples of pulses with variable width and position according to a first embodiment of the present invention.

Reference will now be made in detail to the present preferred embodiments of the invention, examples of which are illustrated in the accompanying drawings. Wherever possible, the same reference numbers will be used throughout the drawings to refer to the same or like parts.

The method and apparatus of the present invention can be used to supply pulses to a variety of scanning systems. However, the method and apparatus of the present invention are particularly applicable for use with printers and cathode ray tubes.

The following discussion describes an exemplary embodiment of the present invention, in which a laser printer and the pulse modulator of the present invention are illustrated. In FIG. 1, an electronic laser printer 510 includes a developable image processing section 512, an input 508 for data words, and an image printing section 514 for generating a variable intensity and duration imaging beam of light 516 for scanning across photoreceptor 520 of section 512 to provide multiple level exposure for printing.

Processing section 512 includes a photoreceptor 520 illustrated herein in the form of an endless belt 506 stretched across drive and idler belt support rollers 522 and 523, respectively, on which latent electrostatic images representative of the data words input through 508 are created. Belt supporting rollers 522 and 523 are rotatably mounted in predetermined fixed positions by suitable means (not shown). Roller 523 is driven from a suitable drive motor (not shown) to move photoreceptor 520 in the direction shown by the solid line arrow. While photoreceptor 520 is illustrated in the form of an endless belt, other photoreceptor configurations such as a drum are envisioned.

Photoreceptor 520 comprises an inner layer or substrate of a suitable flexible electrically conductive substrate with an outer photoconductive layer 527 such as selenium thereupon. Photoreceptor 520 may be opaque, that is, impervious to light or wholly or partially transparent. An exemplary photoreceptor 520 typically has an aluminum substrate which renders the photoreceptor opaque. However, other substrate materials such as glass, may be used which would render photoreceptor 520 wholly or partially transparent. Materials for outer photoconductive layer 527 other than selenium as, for example, organic photoreceptors, may also be used. One organic type material, for example, consists of an aluminized Mylar substrate having a layer of selenium dispersed in poly-N-vinyl carbazole with a transparent polymer overcoating containing a charge transport compound such as pyrene.

A corona charging device 530 commonly known as a corotron is operatively disposed adjacent photoreceptor 520 at charging station 531. Corotron 530, which is coupled to a suitable negative high voltage source 570, serves to place a uniform negative charge on photoreceptor 520 in preparation for imaging.

Imaging beam 516 of image printing section 514 is incident on photoreceptor 520 at exposure point 534. Imaging beam 516 is derived from an individual self modulated diode laser 525. The intensity and duration of beam 516 is at one of multiple levels according to the data words input at 508. Beam 516 is swept across photoreceptor 520 transverse to the indicated direction of motion by a rotating polygon mirror 528. A suitable lens 532 focuses beam 516 onto photoreceptor 520.

A development subsystem 537, exemplified herein by a magnetic brush roll, is disposed in operative contact with photoreceptor 520 downstream of the contact point 534 of imaging beam 516. Development subsystem 537 includes a suitable developer housing (not shown) within which a supply of developer is provided together with means for loading the developer onto the development subsystem's magnetic brush roll.

The development subsystem preferably comprises a non-scavenging development system using a mono-component developer, the mono-component developer being a relatively small colorant material (referred to as toner). Due to electrostatic forces, the toner is drawn to the latent electrostatic image formed on photoreceptor 520 by imaging beam 516 in proportion to the charge level of the latent image to develop the image. In the present arrangement, a discharge development system is used, following negative charging of photoreceptor 520 by corotron 530, image areas are discharged by beam 516 in accordance with image signals. The developing toner is negatively charged and is therefore attracted to the discharged image areas while being repelled from the non-discharged areas.

As will be understood, in the development subsystem of this type, when the intensity of beam 516 is at a maximum, maximum development occurs and a fully black pixel is obtained. When beam 516 is turned off, no development occurs and a white pixel is obtained. In the embodiment of the present invention described, multiple intermediate gray pixel levels are provided. These levels are obtained by providing intermediate beam intensity levels so that corresponding intermediate amounts of development take place to provide predetermined light gray and dark gray pixels. The data words contain the information for controlling the beam intensity and duration. It will be understood that any suitable source of power for operating diode 525 at the various intensity levels may be used.

Following development of the latent electrostatic image on photoreceptor 520 by developing subsystem 537, the developed image is transferred to a suitable copy or print substrate material 541 such as paper at transfer station 540. To facilitate transfer, a transfer corotron 542, which is coupled to a high voltage power source 572, is provided to attract the developed image on photoreceptor 520 to copy substrate material 541. Following transfer, the developed image is fixed by fusing. Any residual charges and/or developing material left on photoreceptor 520 are removed at cleaning station 545 by erase lamp 547 and cleaning brush 546.

The following discussion describes the pulses formed by the pulse width, position, and amplitude modulator (pulse modulator) with reference to FIGS. 2 and 3(a) to 3(d).

FIG. 2 shows the general organization for pulse formation of the pulse modulator. The width and position of a pulse 11 within a pixel period 13 may be varied with separate, independently variable delays for the leading edge 15 and trailing edge 17 of the pulse 11. A leading edge delay 19 is defined from the beginning of a pixel period 31 to the leading edge of the pulse 15. A trailing edge delay 33 is defined from the leading edge of the pulse 15 to the trailing edge of the pulse 17.

FIGS. 3(a) to 3(d) show exemplary pulse characteristics of the invention. In FIG. 3(a), a pulse 11 is formed in the middle of a pixel period 13 by using a leading edge delay 19 measured from the beginning of the pixel period 31 to the leading edge of the pulse 15. A trailing edge delay 13 is measured from the leading edge of the pulse 15 to the trailing edge of the pulse 17. As in all of the illustrations of FIGS. 3(a) to 3(d), the leading edge 15 and trailing edge 17 delays are independently variable.

Figure 3B:
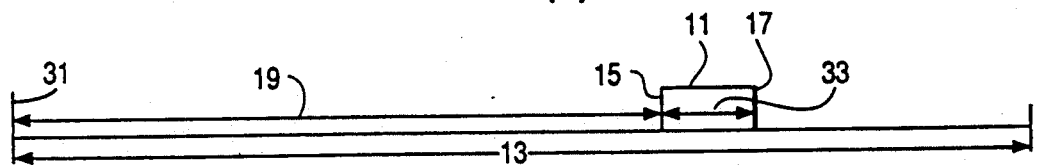
Figure 3C:
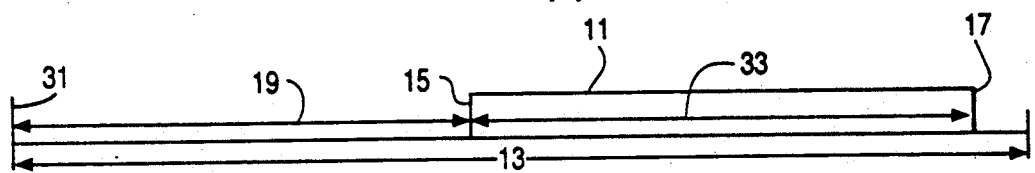
Figure 3D:
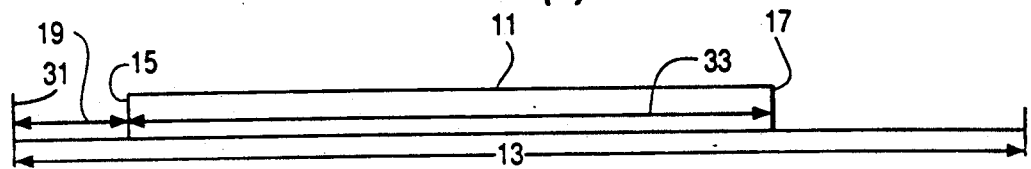

In FIG. 3(b), a pulse 11 of the same width, but with different position within the pixel period 13, is formed by using a longer leading edge delay 19 and the same trailing edge delay 33 as in FIG. 3(a). In FIG. 3(c), a wide pulse 11 having a long duration, but the same beginning position as in FIG. 3(a), is formed by using the same leading edge delay 19 and a longer trailing edge delay 33 than in FIG. 3(a). In FIG. 3(d), an even wider pulse of longer duration is formed earlier in the pixel period 13 by using a shorter leading edge delay 19 and a longer trailing edge delay 33 than in FIG. 3(a).

FIGS. 4 and 5 show an alternative pulse forming embodiment. The alternative embodiment is similar to the embodiment of FIGS. 2 and 3, except that the trailing edge delay 35 is defined from the beginning of the pixel period 31, like the leading edge delay 19, instead of from the leading edge of the pulse 15.

In FIG. 4, the general organization for pulse formation of the alternative embodiment of the pulse modulator is illustrated. The width and position of a pulse 11 within a pixel period 13 may be varied with separate, independently variable delays for the leading edge 15 and trailing edge 17 of the pulse 11. A leading edge delay 19 is defined from the beginning of a pixel period 31 to the leading edge of the pulse 5. A trailing edge delay is defined from the beginning of the pixel period 31 to the trailing edge of the pulse 17.

Figure 5A:
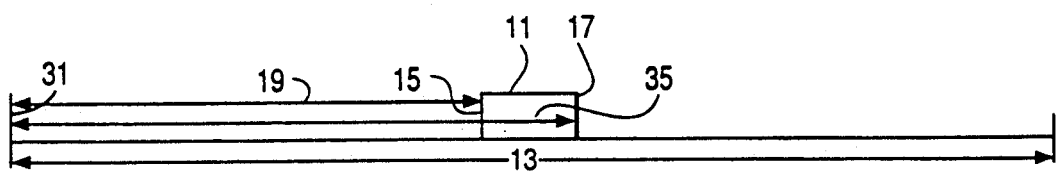
FIGS. 5(a) through 5(d) are schematic diagrams which show examples of pulses with variable width and position according to a second embodiment of the present invention.
Figure 5B:
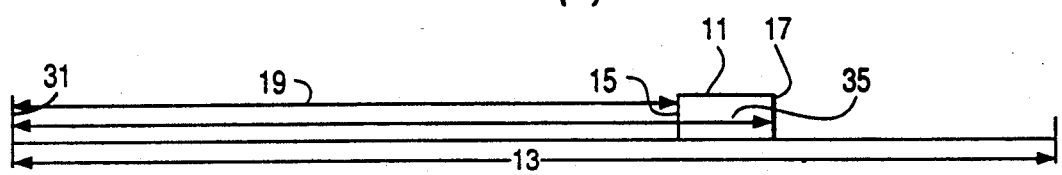
Figure 5C:
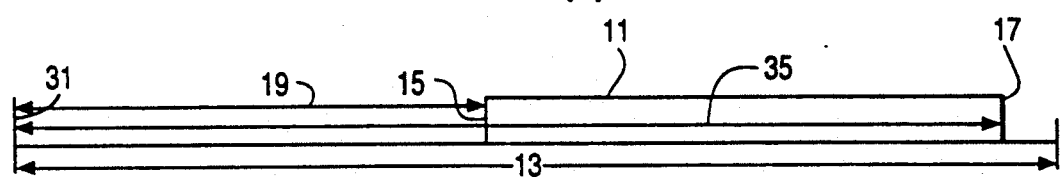
Figure 5D:
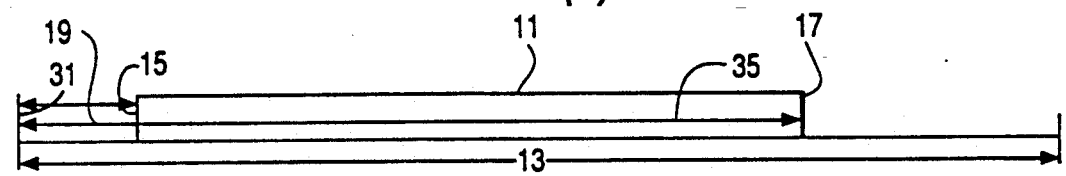

FIGS. 5(a) to 5(d) show exemplary pulse characteristics of the alternative pulse forming embodiment of the pulse modulator. In FIG. 5(a), a pulse 11 is formed in the middle of a pixel period 13 by using a leading edge delay 19 measured from the beginning of the pixel period 31 to the leading edge of the pulse 15. A trailing edge delay 35 is measured from the beginning of the pixel period 31 to the trailing edge of the pulse 17. In FIG. 5(b), a pulse 11 of the same width but different position within the pixel period 13 is formed by using a longer leading edge delay 19 and a corresponding longer trailing edge delay 15. In FIG. 5(c), a wide pulse 11 having a long duration but the same beginning position as in FIG. 5(a) is formed by using the same leading edge delay 19 but a larger trailing edge delay 35 than in FIG. 5(a). In FIG. 5(d), an even wider pulse 11 of longer duration is formed earlier in the pixel period 13 by using a shorter leading edge delay 19 and a longer trailing edge delay 15 than in FIG. 5(a).

Each pulse 11 is formed according to the information in a corresponding data word. A series of data words is input into the pulse modulator 578, and each data word is consecutively translated into a set of pulse attribute words. Each pulse attribute word corresponds to a characteristic of a corresponding pulse to be formed by the pulse modulator. Thus, each data word contains the information for forming a pulse.

FIGS. 6(a) to 6(e) and 7(a) and (b) illustrate an exemplary embodiment of the present invention. In FIG. 6(a), a data word of n bits per pixel, where n is eight, is used. It is understood that n may be chosen larger or smaller depending on the needs of the system. In the exemplary embodiment of FIGS. 6(a) through 6(e), three pulse attribute lookup tables are illustrated. Because each data word is 8 bits in the preferred embodiment, a data word may address 256 unique pulse attributes in each look up table.

FIG. 6(a) shows an exemplary embodiment where 1000 different delay times are available. The delay times of 0–999 are evenly divided along the pixel period 13. In an embodiment using the convention of FIGS. 4 and 5(a) to 5(d), for example, a delay time of 500 is a delay measured from the beginning of the pixel period 31 to a time when half of the pixel period 13 has passed. As another example, a delay time of 10 is measured from the beginning of the pixel period 31 to a time when 1/100th of the pixel period 13 has passed.

FIG. 6(d) shows an exemplary embodiment where 500 different pulse amplitudes are available. The delay pulse amplitudes 0–499 are evenly divided so that 0 represents no pulse, and 499 represents a pulse of maximum amplitude.

FIGS. 6(b), 6(c), and 6(e) show lookup tables for translating a data word into three pulse attribute words. FIG. 6(b) is a lookup table for translating a data word into a pulse attribute word for the leading edge of a pulse. FIG. 6(c) is a lookup table for translating a data word into a pulse attribute word for the trailing edge of a pulse. FIG. 6(e) is a lookup table for translating a data word into a pulse attribute word for the amplitude of a pulse.

The lookup tables may be loaded with any desired combination of pulse attributes. For example, the lookup table for pulse attribute leading edge delay times has delay time 10 loaded at address 00000000 so that an 8 bit data word 00000000 would generate a leading edge pulse attribute word representing a delay time of 10. Alternatively, other delay times may be placed at address 00000000 in the lookup table to replace the delay time of 10.

All three lookup tables 6(b), 6(c), and 6(e) are addressed by the same data word, and each lookup table generates a separate, unique pulse attribute word.

Figure 7A:
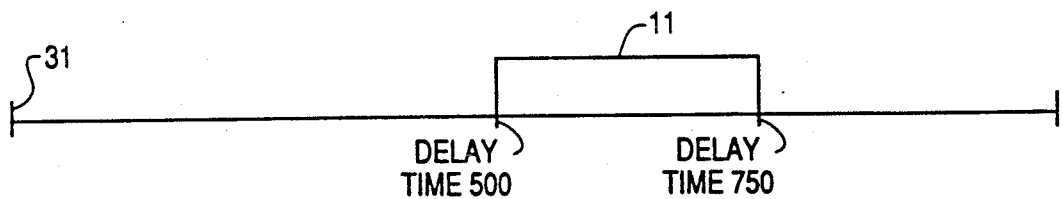
FIGS. 7(a) and 7(b) are schematic diagrams showing examples of pulses formed from data words.
Figure 7B:
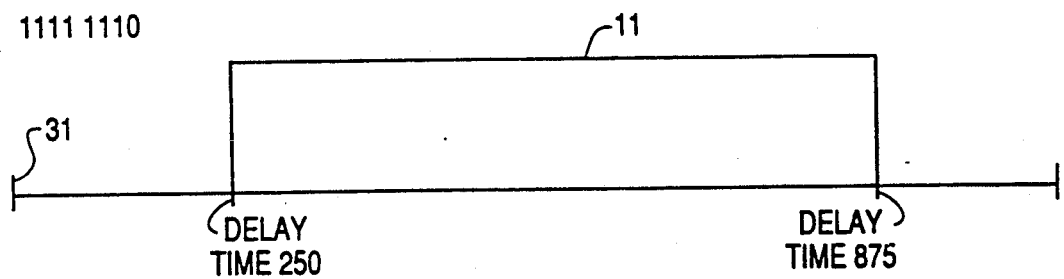

FIGS. 7(a) and 7(b) are examples of the formation of a pulse from a data word and its corresponding pulse attribute words. Continuing with the embodiment using the convention of FIGS. 4 and 5(a) to 5(d), FIG. 7(a) shows a pulse formed from a data word 00000010. The tables of FIGS. 6(b), 6(c), and 6(e) generate pulse attribute words representing a leading edge have a delay time of 500, a trailing edge having a delay time of 750, and an amplitude of 250. The pulse 11 is formed with the respective leading edge delay time, trailing edge delay time, and amplitude. FIG. 7(b) shows a pulse formed from a data word 11111110 where, using the tables of FIG. 6, the pulse 11 is formed with a leading edge delay time of 250, a trailing edge delay time of 875, and an amplitude of 499.

The architecture of the pulse modulator will now be described with reference to FIG. 8. A series of data words, each n bits per pixel where n is 8 in the preferred embodiment, is input into the pulse modulator from an image source 101, such as a computer or an image scanner. The series of data words may be sent through a video expansion port 103 to other pulse modulators (not shown) for parallel processing, such as in the case of color printing where similar processing of the video information is performed for different colors.

The present invention further includes translating means, splitting means, pulse forming means, and generating means. In the pulse modulator of FIG. 8, a data word from the series is sent through a RAM address multiplexer 105 to a translating means. As embodied herein, the translating means comprises four RAM lookup tables 107, 109, 111, and 113. Each data word represents an address within the four RAM lookup tables 107, 109, 111, and 113. In a preferred embodiment, a pair of 256×4 ECL RAM lookup tables is used to generate a pulse attribute word for each pulse attribute sought to be controlled. Pulse attributes may include leading edge delay, trailing edge delay, amplitude of the pulse to be formed, and other special features. Alternatively, a single 256×8 ECL RAM lookup table may be used to generate each pulse attribute word. The embodiment of FIG. 8 shows two pairs of 256×4 RAM lookup tables 107 and 109, 111 and 113 which correspond to the two pulse attributes of leading edge delay and trailing edge delay. The pulse modulator will accommodate as many pairs of 256×4 RAM lookup tables as there are desired pulse attributes. For example, a third pair of 256×4 RAM lookup tables may be used to control the amplitude of a pulse to be formed.

Once an address in each RAM lookup table is accessed by the data word, each RAM lookup table generates a nibble (4 bits) of information. Thus, each pair of RAM lookup tables generates a pulse attribute word (8 bits) corresponding to the pulse attribute sought to be controlled.

Characteristic data indicative of the pulse attributes sought to be controlled in a pulse modulator may be downloaded into the RAM lookup tables 107, 109, 111, and 113 from the lookup table download interface 115. By using a lookup table down load interface 115 for the RAM lookup tables 107, 109, 111, and 113, the pulse attributes can be changed by loading a new set of pulse attribute data into the RAM lookup tables 107, 109, 111, and 113 before printing. To load data into the RAM lookup tables 107, 109, 111, and 113, the lookup table download interface 115 first instructs the RAM address multiplexer 105 to enable the lookup table address bus 117 instead of the video data bus 119 so that the lookup table download interface 115 may designate the addresses that correspond to memory locations in the RAM lookup tables 107, 109, 111, and 113 that are to be changed.

Once the lookup table download interface 115 accesses an address of a RAM lookup table, a pulse attribute data nibble may be loaded into the RAM lookup table through the lookup table data bus 117 from the lookup table download interface 115. This allows for different mapping functions in the same pulse modulator for different printing characteristics (i.e., font smoothing, graphics, etc). This further facilitates maintenance of print quality as the components of the system age. Thus, for example, the pulse characteristics can be changed as the photoreceptor ages. After the RAM lookup tables 107, 109, 111, and 113 are loaded, the lookup table download interface 115 instructs the RAM address multiplexer 105 to receive data from the video data bus 119.

Figure 8:
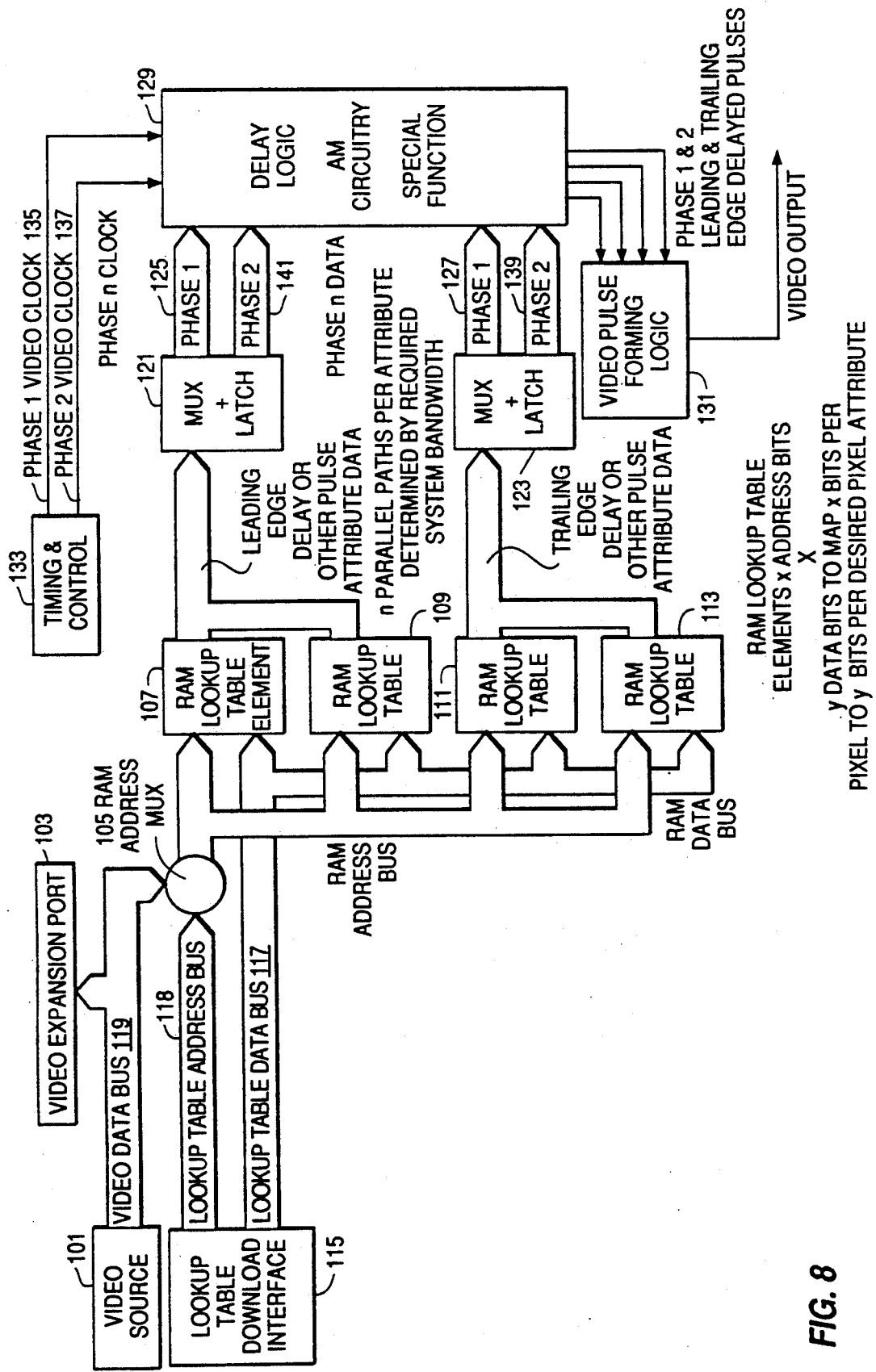
FIG. 8 is a schematic block diagram of a pulse modulator according to a first embodiment of the present invention.

In the embodiment of FIG. 8, the four RAM lookup tables 107, 109, 111, and 113 perform a logic mapping function, which translates the incoming data word into two pulse attribute words to control the formation of a pulse. The two RAM lookup tables for each pulse attribute word are described as follows. In FIG. 8, the top two RAM lookup tables 107 and 109 generate separate nibbles of pulse attribute information which combine to form a pulse attribute word for the leading edge delay of a pulse to be formed. The bottom two RAM lookup tables 111 and 113 generate separate nibbles of pulse attribute information which combine to form a pulse attribute word for the trailing edge delay of a pulse to be formed.

Each pulse attribute word is fed to a respective splitting means. As embodied herein, the splitting means comprises multiplexer and latch blocks 121 and 123. In the preferred embodiment, each respective multiplexer and latch block contains two latches, one for each of the phase 1 and phase 2 buses. The two pulse attribute words generated in the RAM lookup tables 107, 109, 111, and 113 from a data word are latched onto the phase 1 buses by their respective multiplexers 121 and 123 at a leading edge of a pulse from the phase 1 video clock 135.

The two data words latched on their respective phase 1 buses 125 and 127 are further processed on separate channels in a pulse forming means corresponding to each channel. As embodied herein, the pulse forming means comprises a delay logic block 129 for forming separate leading and trailing edge delayed pulses and a video pulse forming logic block 131. The video pulse forming logic block 131 forms a single pulse from the leading and trailing edge delay pulses. The single pulse is then generated by a generating means. As embodied herein, the generating means comprises the video pulse forming logic block 131.

It is noted that the speed of a typical scanning system, with only a single phase video clock and corresponding phased set of busses, is limited by the speed at which its delay and pulse forming logic 129 and 131 can operate on pulse attribute words and then be reset to accept new pulse attribute words. In the embodiment shown in FIG. 8, with only the phase 1 video clock 135 and phase 1 busses 125 and 127, the delay and pulse forming logic blocks 129 and 131 may limit the processing speed of the pulse modulator. Specifically, while the two pulse attribute words corresponding to the first data word are being processed by the delay and pulse forming logic blocks 129 and 131, a second pair of pulse attribute words corresponding to a second data word will already be formed, waiting at the respective multiplexer and latch blocks 121 and 123 to be latched onto the phase 1 busses 125 and 127 and processed by the delay and pulse forming logic 129 and 131.

Figure 9:
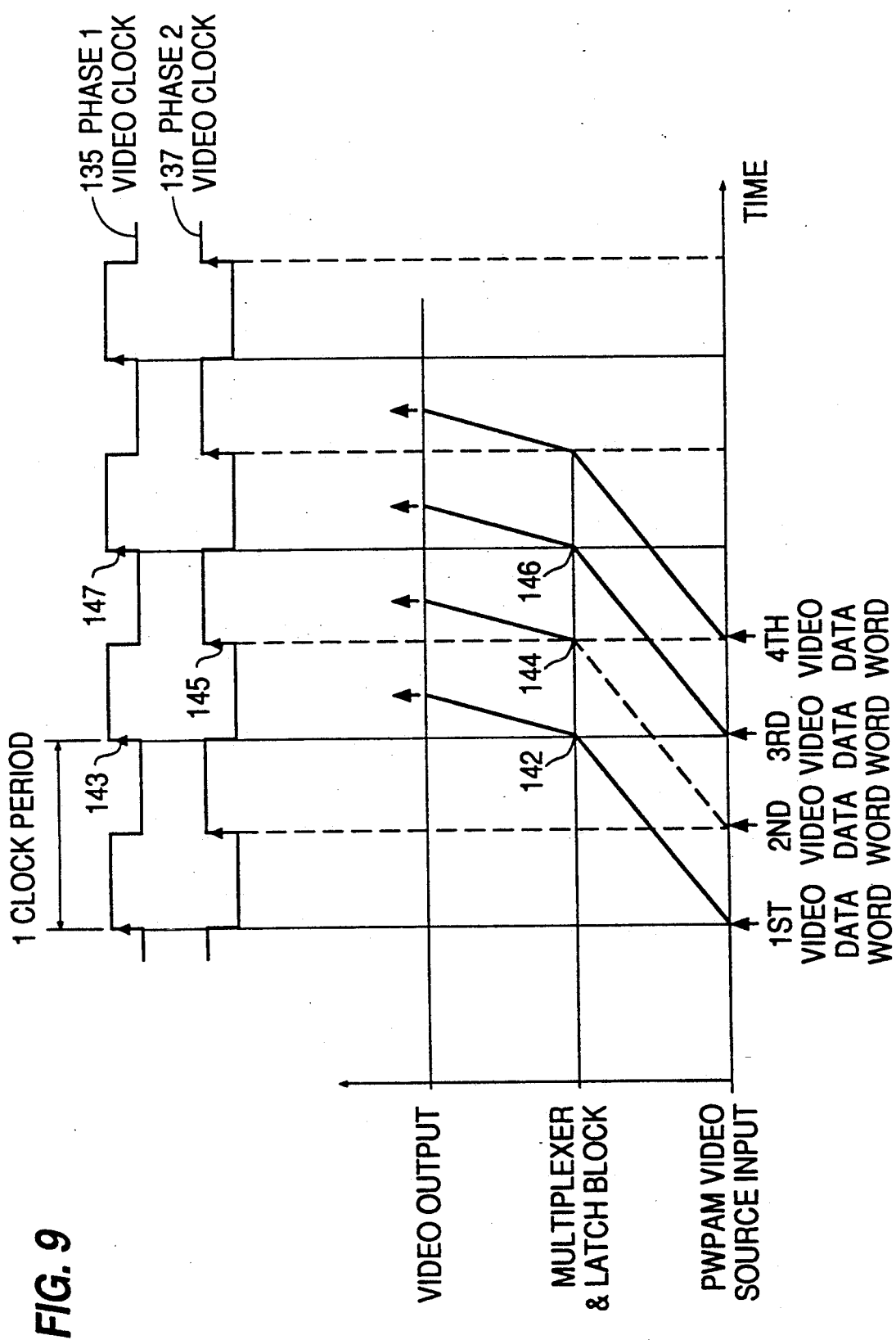
FIG. 9 is a timing diagram of the timing of pulse attribute words into the delay logic block with respect to two sets of phased buses.

FIG. 9 illustrates the timing of the pulse modulator delay and pulse forming blocks. The timing and control block 133 of FIG. 8 generates a phase 1 video clock 135 and a phase 2 video clock 137. Both clocks are operated at the same frequency, but the phase 2 video clock 137 is one half clock period behind the phase 1 video clock 135. For purposes of illustration, if it is assumed that a new data word is input into the pulse modulator by the image source 101 every one half clock period, the time needed to form a pair of pulse attribute words from a data word (the time from the image source 101 to the multiplexer and latch blocks 121 and 123) is one clock period, and the delay and pulse forming logic blocks 129 and 131 take a quarter of a clock period to process and generate the pair of pulse attribute words and be reset for the next pair of pulse attribute words to be input.

Figure 10:
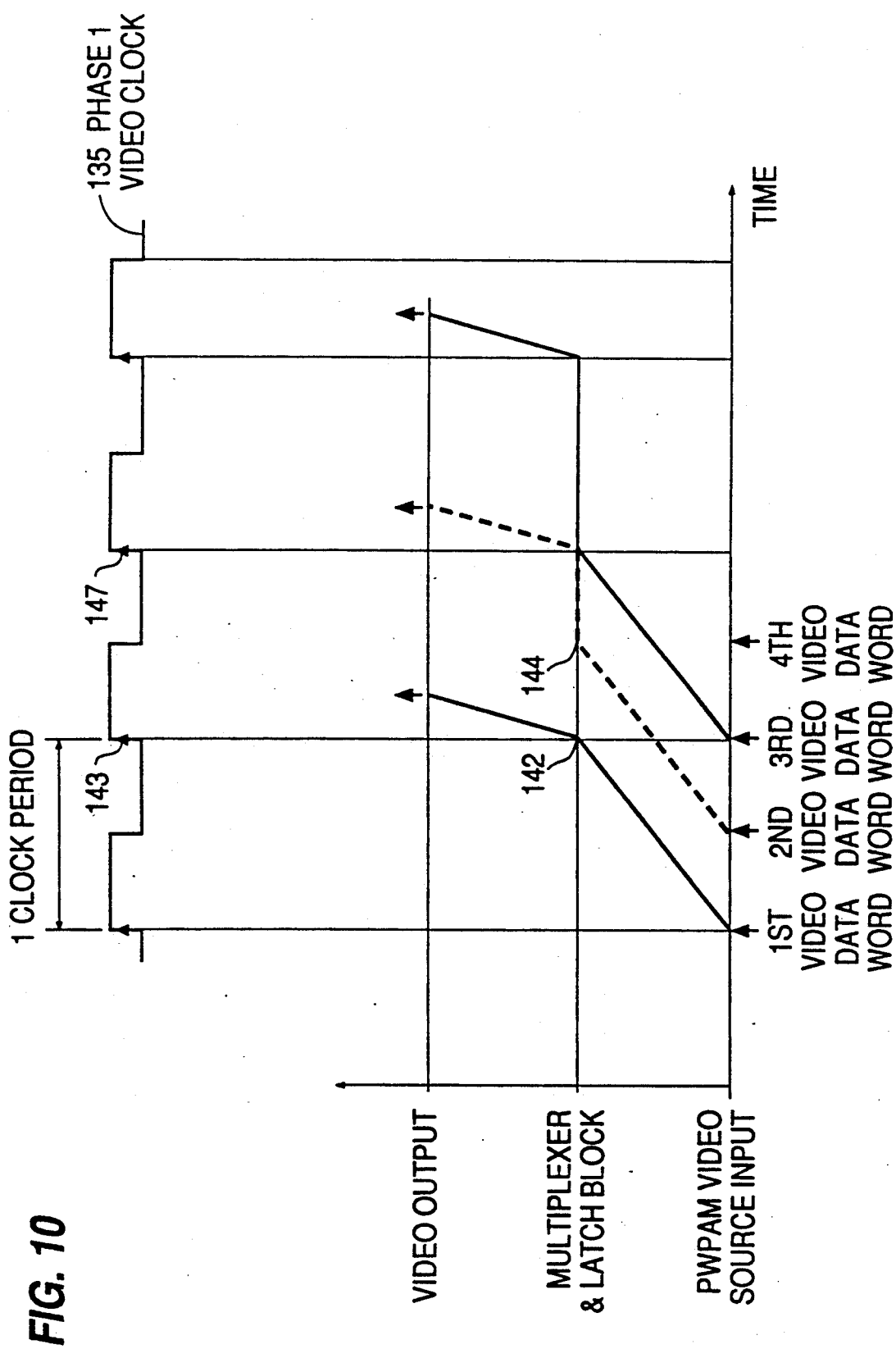
FIG. 10 is a timing diagram of the timing of pulse attribute words into the delay logic block with respect to one set of phased buses.

First, with reference to FIG. 10, an analysis of the pulse modulator will be made considering only the phase 1 buses 125 and 127 and the single phase 1 video clock 135 of the pulse modulator of FIG. 8. Considering a pulse modulator built without the phase 2 buses 139 and 141 and phase 2 video clock 137, it is seen that a first pair of pulse attribute words will be latched onto the phase 1 bus lines 125 and 127 at point 142 in FIG. 10. FIG. 10 shows that this latching will occur at a second rising edge 143 of the phase 1 video clock 135. At this time, the delay logic block 129 begins processing the first pair of pulse attribute words under the phase 1 video clock 135, and since data can only be latched onto the set of phase 1 buses at the rising edge of the phase 1 video clock, the delay logic block 129 will not be ready to accept another pair of pulse attribute words until the third rising edge 147 of the phase 1 video clock 135 occurs. Thus, a second pair of pulse attribute words cannot be latched onto the phase 1 buses 125 and 127 until one clock period of the phase 1 video clock 135 has passed.

However, as shown at 144 in FIG. 10, the second pair of pulse attribute words will have arrived at the respective multiplexer and latch blocks 121 and 123 one half clock period behind the first pair of pulse attribute words, and will have to wait to be latched onto the phase 1 buses 125 and 127 until the third rising edge 147 of the phase 1 video clock 135 occurs. Thus, the second pair of pulse attribute words arrives at their respective multiplexer and latch blocks 121 and 123, ready to be latched, every one half clock period, but a new pair of pulse attribute words can only be latched onto the phase 1 buses 125 and 127 every clock period.

To overcome this time limitation, and in accordance with the present invention, the phase 2 data buses 139 and 141 and phase 2 video clock 137 with phase one half clock period behind the phase 1 video clock 135 are used. With reference to FIG. 9, the second pair of pulse attribute words at 144 can now be routed and latched by their respective multiplexer and latch blocks at the second rising edge 145 of the phase 2 video clock 137 onto the phase 2 buses 139 and 141, one half clock period after the first two pulse attribute words are routed by their respective multiplexers 121 and 123 onto the phase 1 buses 125 and 127. The second pair of pulse attribute words is then processed on separate channels in the delay logic block 129 under the phase 2 video clock 137 to form leading and trailing edge delayed pulses. Accordingly, the second pair of pulse attribute words is sent into the delay logic block 129 only one half clock period behind the first pair of pulse attribute words with the use of the phase 2 buses 139 and 141 and phase 2 video clock 137. In summary, the two pairs of pulse attribute words are processed in parallel, one half clock period apart, so that the first pulse is generated while the second pulse is being formed.

Continuing with the example of FIG. 9, after the second pair of pulse attribute words is routed onto the phase 2 buses 139 an 141 under the phase 2 video clock 137 at 144, a third pair of pulse attribute words will have arrived at the multiplexer and latch blocks 121 and 123, as shown at 146, one half clock period behind the second pair of pulse attribute words. The first pair of pulse attribute words will now have been latched on the phase 1 buses 125 and 127 from the time of the second rising edge 143 to the time of the third rising edge 147 of the phase 1 video clock 135. Processing of the first pair of pulse attribute words will now be completed, and the third rising edge 147 of the phase 1 video clock 135 will allow the third pair of pulse attribute words to be latched onto the phase 1 buses 125 and 127. The phase 1 buses and video clock 135 will latch the third pair of pulse attribute words at the third rising edge 147 of the phase 1 video clock 135 at 146 in FIG. 9. Since one clock period will have passed since the first pair of pulse attribute words were latched onto the phase 1 buses 125 and 127, the delay logic block 129 can now accept the third pair of pulse attribute words on the phase 1 buses 125 and 127 under the phase 1 video clock 135 one half clock period behind the second pair of pulse attribute words.

Thus, with the two sets of phased busses 125, 127 and 139, 141 into the delay logic block 129, the pulse attribute words from the RAM lookup tables 107, 109, 111, and 113 are split and sent through separate pulse forming circuits (within delay logic block 129). This allows one pulse to be generated as the following one is being set up. By using two channels to form the pulses, the system can operate at near the maximum speed of the logic devices used. For lower speed systems less complicated logic devices would be utilized. Additional circuitry bypasses the delay section of the system for the all "on" and all "off" pixel periods. This is to eliminate pixel to pixel distortions which may be caused by timing variations in the processing paths.

The example above is given only as an illustration of the basic operation of the pulse modulator. The pulse modulator may be configured to look up, by means of additional RAM lookup tables, as many pulse attribute words as are needed to form a desired pulse. Referring to the pulse modulator of FIG. 8, each additional pulse attribute would require an additional pair of RAM lookup tables for generating a corresponding pulse attribute word, a multiplexer and latch block, a set of phased buses, a video clock, and channels through the delay and pulse forming logic blocks 129 and 131 corresponding to the added set of phased buses.

Figure 11:
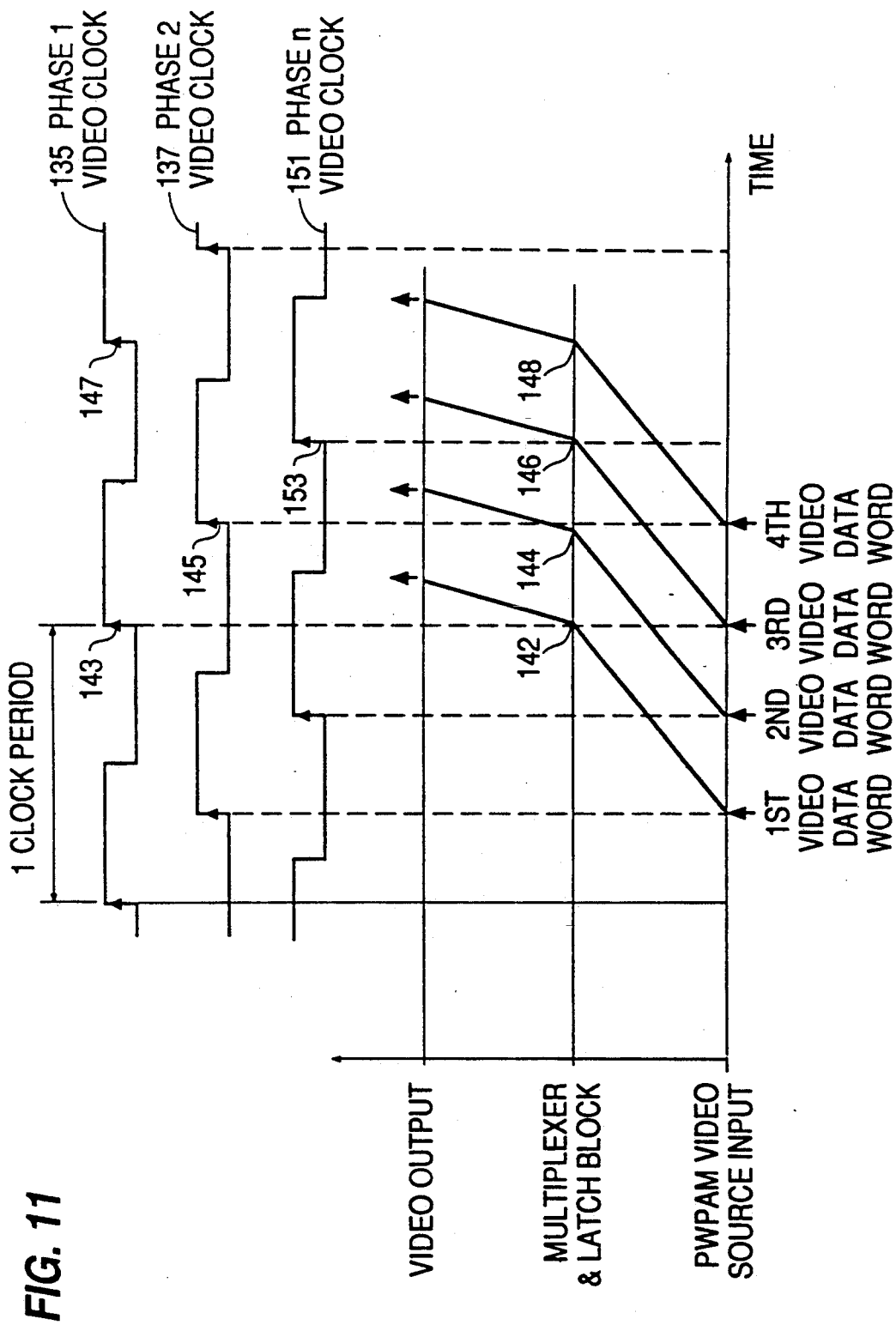
FIG. 11 is a timing diagram of the timing of pulse attribute words into the delay logic block with respect to three sets of phased buses.

Moreover, the pulse modulator may have more than 2 phased buses and corresponding video clocks and channels through the delay and pulse forming logic blocks 129 and 131, for each pulse attribute. With reference to FIG. 11, an example of three phased routes will be given under the assumption that a new data word (the time from the image source 101 to the multiplexer and latch blocks 121 and 123) is input into the pulse modulator every third of a clock period, that the time needed to form a pair of pulse attribute words from a data word is two thirds of a clock period, and that the delay and pulse forming logic blocks 129 and 131 take one sixth of a clock period to process and generate the pair of pulse attribute words and reset for the next pair of pulse attribute words.

In this example, a third set of phased buses and a phase 3 video clock 151 are used to route pulse attribute words into the delay logic block 129. The timing and control block 133 generates a phase 1 video clock 135, a phase 2 video clock 137, and a phase 3 video clock 151. All three clocks are the same frequency, but the phase 2 video clock 137 is one third clock period behind the phase 1 video clock 135, and the phase 3 video clock 151 is one third clock period behind the phase 2 video clock 137.

With reference to FIG. 11, it is seen that a first pair of pulse attribute words will be latched onto the phase 1 buses 125 and 127 at 142 at the second rising edge 143 of the phase 1 video clock 135. At this time, the delay logic block 129 will begin processing the first pair of pulse attribute words under the phase 1 video clock 135, and will not be ready to accept another pair of pulse attribute words o the respective phase 1 busses until the third rising edge 147 of the phase 1 video clock 135 occurs one clock period later. The second pair of pulse attribute words will have arrived one third clock period behind the first pair of pulse attribute words as shown at 144, and the second pair of pulse attribute words can now be routed and latched by their respective multiplexer and latch blocks 121 and 123 at the second rising edge 145 of the phase 2 video clock 137 onto the phase 2 buses 139 and 141. The second pair of pulse attribute words are then processed on separate channels in the delay logic block 129 under the phase 2 video clock 137 to form leading and trailing edge delayed pulses. Next, the third pair of pulse attribute words will have arrived as shown at 146 one third clock period behind the second pair of pulse attribute words, and the third pair of pulse attribute words can now be routed and latched by their respective multiplexer and latch blocks 121 and 123 at the second rising edge 153 of the phase 3 video clock 151 onto the phase 3 buses. Thus, the three pairs of pulse attribute words are processed in parallel, one third clock period apart, so that the first pulse is generated while the second and third pulses are being formed.

Continuing with the example of FIG. 11, after the third pair of pulse attribute words is routed at 146 onto the phase 3 buses under the phase 3 video clock 151, a fourth pair of pulse attribute words will have arrived at the multiplexer and latch blocks 121 and 123 as shown at 148, one third clock period behind the third pair. The first pair of pulse attribute words will now have been latched on the phase 1 buses from the time of the second rising edge 143 to the time of the third rising edge 147 of the phase 1 video clock 135. Processing of the first pair of pulse attribute words will now be completed, and the third rising edge 147 of the phase 1 video clock will allow the fourth pair of pulse attribute words to be latched onto the phase 1 buses 125 and 127 at 148. The phase 1 buses 125 and 127 will latch the fourth pair of pulse attribute words at the third rising edge 147 of the phase 1 video clock 135. It is important to note that with only a single set of phased buses and a single video clock, the pulse modulator would only be able to process one pair of pulse attribute words per clock period instead of three. In summary, the pulse modulator may be expanded to accommodate a greater number of pulse attribute words, and a greater number of phased buses into the delay logic block 129.

Figure 12:
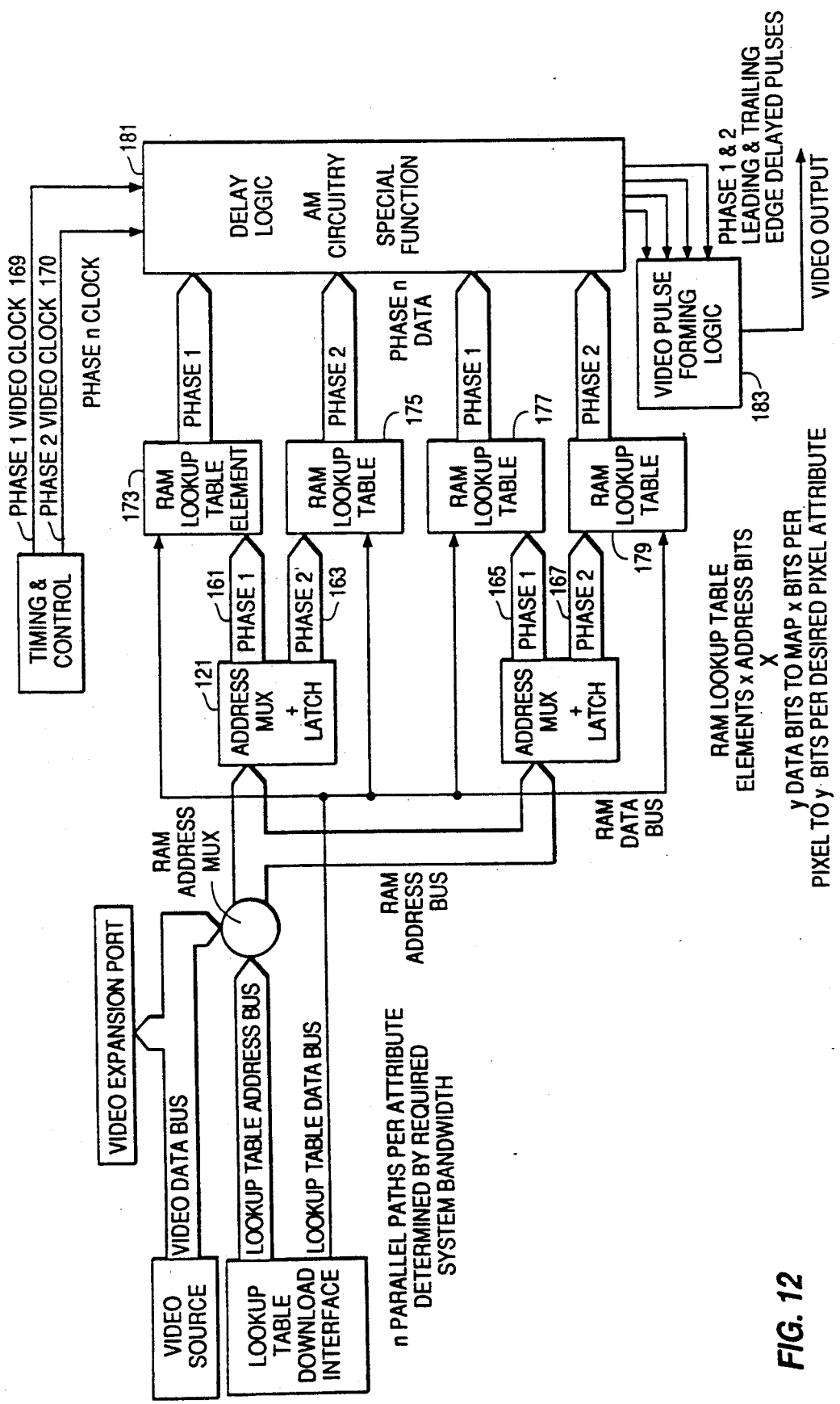
FIG. 12 is a schematic block diagram of a pulse modulator according to a second embodiment of the present invention.

A second embodiment of the pulse modulator is illustrated in FIG. 12. The embodiment of FIG. 12 is similar to the embodiment described above with reference to FIGS. 8-11, with the exception that the data words are immediately channelled onto phased buses 161, 163, 165 and 167 before they are sent to the RAM lookup tables 107, 109, 111, and 113. The phasing of the data words operates in the same manner as described above with reference to FIGS 8-11. In the embodiment of FIG. 12 four 256×8 ECL RAM lookup tables are used; alternatively 4 pairs of 256×4 ECL RAM lookup tables may be used. Once a first data word is phased onto the phase 1 buses 161 and 165 and sent to the phase 1 RAM lookup tables 173 and 177 under the phase 1 video clock 169, a next data word is phased onto the phase 2 buses 163 and 167 and sent to the phase 2 RAM lookup tables 175 and 179 under the phase 2 video clock 171. A data word addresses two pulse attribute words, one corresponding to each pulse attribute, from the phase 1 RAM lookup tables 173 and 177, and the two pulse attribute words are sent into the delay block 181, still under the phase 1 video clock 169. Likewise, the second data word addresses two pulse attribute words from the phase 2 RAM lookup tables 175 and 179, and the two pulse attribute words are sent into the delay logic block 181. Again, the pulse modulator may be expanded to accommodate a greater number of pulse attribute words and a greater number of phased routes into the RAM look up tables 173, 175, 177 and 179 and into the delay and pulse forming logic blocks 181 and 183.

Because the data words are channelled before the RAM lookup tables 173, 175, 177 and 179, slower RAM lookup tables may be used. As in the case of separate phased channels going into the delay and pulse forming logic blocks 181 and 183, performance equivalent to that of faster, more expensive circuitry may be achieved with slower, less expensive RAM lookup tables. The cost trade off may be balanced by the cost of a few faster circuit components versus the cost of several slower circuit components. In the embodiment of FIG. 12, for example, twice as many RAM lookup tables are required to replace the RAM lookup tables of the embodiment of FIG. 8. Similarly, in the delay and pulse forming blocks 181 and 183 (and also in the delay and pulse forming logic blocks 129 and 131 of FIG. 8), twice as many delay and pulse forming circuits are required for two phased processing, and three times as many delay and pulse forming circuits are required for three phased processing, than are required for single phased processing.

It will be apparent to those skilled in the art that various modifications and variations can be made in the pulse modulator of the present invention and in construction of this pulse modulator without departing from the scope or spirit of the invention. As an example, the pulse modulator may be expanded to accommodate a greater number of pulse attribute words and a greater number of phased routes into the RAM look up tables.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A digital electronics system for generating pulses from a series of data words comprising:
    means for translating the series of data words into a series of pulse attribute words, wherein each of said pulse attribute words includes information for controlling a formation of a corresponding pulse;
    means for splitting the series of pulse attribute words into two channels;

means corresponding to each channel and accepting pulse attribute words from respective channels, for forming pulses using the information included in the pulse attribute words for controlling the formation of the pulses; and means for generating the pulses, wherein a first pulse is generated while a second pulse is being formed by the forming means.

2. The digital electronics system according to claim 1, wherein the translating means includes means for translating the series of data words into first and second series of pulse attribute words, the first series of pulse attribute words corresponding to formation of a leading edge of each pulse, and the second series of pulse attribute words corresponding to formation of a trailing edge of each pulse.

3. The digital electronics system according to claim 2, wherein each pulse attribute word corresponding to formation of a leading edge of a pulse contains information for a delay, measured from a beginning of a pixel period to the leading edge of the pulse, and each pulse attribute word corresponding to the formation of a trailing edge of a pulse contains information for a delay, measured from a beginning of a pixel period to the trailing edge of the pulse, and wherein the information for the delay to the leading edge of the pulse and the information for the delay to the trailing edge of the pulse are independently variable.

4. The digital electronics system according to claim 2, wherein each pulse attribute word corresponding to the formation of a leading edge of a pulse contains information for a delay, measured from a beginning of a pixel period to the leading edge of the pulse, and each pulse attribute word corresponding to the formation of a trailing edge of a pulse contains information for a delay, measured from the leading edge of the pulse to the trailing edge of the pulse, and wherein the information for the delay to the leading edge of the pulse and the information for the delay to the trailing edge of the pulse are independently variable.

5. The digital electronics system according to claim 1, wherein the translating means includes means for translating the incoming series of data words into first, second, and third series of pulse attribute words, the first series of pulse attribute words corresponding to formation of a leading edge of each pulse, and the second series of pulse attribute words corresponding to formation of a trailing edge of each pulse, and the third series of pulse attribute words corresponding to formation of an amplitude of each pulse.

6. The digital electronics system according to claim 1, wherein the translating means includes means for translating the series of data words into N series of pulse attribute words, where N represents a desired number of pulse attributes that contribute to the formation of the pulses.

7. The digital electronics system according to claim 1, wherein the translating means includes a RAM lookup table for each series of pulse attribute words, and wherein a single data word from the series of data words is used to address all of the RAM lookup tables for each series of pulse attribute words in parallel.

8. The digital electronics system according to claim 7, wherein each RAM lookup table generates a pulse attribute word into corresponding series of pulse attribute words, in response to an address given by the data word.

9. The digital electronics system according to claim 7, further including means for downloading the translating means with new pulse attribute words in order to change pulse characteristics of the digital electronics system.

10. The digital electronics system according to claim 1, wherein the splitting means comprises a multiplexer for each series of pulse attribute words, for splitting each representative series into two channels.

11. The digital electronics system according to claim 10, wherein each multiplexer for each series of pulse attribute words includes a latch for each of the two channels corresponding to each multiplexer.

12. The digital electronics system according to claim 11, wherein each of the two channels is clocked at a frequency offset in phase from and having a same frequency as the clocks on other channels.

13. The digital electronics system according to claim 12, wherein the generating means comprises as many pulse forming means as there are channels.

14. The digital electronics system according to claim 13, wherein the channels corresponding to each multiplexer are consecutively fed pulse attribute words from the multiplexer so that each pulse forming means, corresponding to a respective channel, consecutively generates a pulse while the other pulse forming means are forming pulses.

15. In a digital electronics system, a method for generating pulses from a series of data words, wherein the method comprises the following steps:

translating the series of data words into two series of pulse attribute words wherein each of said pulse attribute words includes information for controlling a formation of a corresponding pulse;

splitting each series of pulse attribute words into two channels;

accepting pulse attribute words from respective channels;

forming pulses, using the information included in the pulse attribute words for controlling formation of the pulses; and generating pulses, wherein a first pulse is generated while a second pulse is being formed.

* * * * *